United States Patent [19]

Silverbrook

[11] Patent Number: 5,627,952
[45] Date of Patent: May 6, 1997

[54] INFORMATION DISPLAYING SYSTEM WHICH DISPLAYS COMBINED VIDEO AND GRAPHICS IMAGES

[75] Inventor: Kia Silverbrook, Woollahra, Australia

[73] Assignees: Canon Kabushiki Kaisha, Japan; Canon Information Systems Research Australia Pty Limited, Australia

[21] Appl. No.: 53,218

[22] Filed: Apr. 28, 1993

[30] Foreign Application Priority Data

Apr. 29, 1992 [AU] Australia ................. PL2151

[51] Int. Cl.$^6$ ................. G06T 15/70
[52] U.S. Cl. ................. 395/135; 395/173
[58] Field of Search ................. 395/133–136, 395/141, 120, 121, 155–161, 152, 140, 149, 150, 162; 345/1–6

[56] References Cited

U.S. PATENT DOCUMENTS

| | | | |
|---|---|---|---|
| 4,965,559 | 10/1990 | Dye | 345/1 |
| 4,965,753 | 10/1990 | Kraemer | 395/121 |
| 5,065,343 | 11/1991 | Inoue | 395/162 |
| 5,229,852 | 7/1993 | Maietta et al. | 358/140 |
| 5,280,576 | 1/1994 | Cao | 395/150 |
| 5,283,861 | 2/1994 | Dangler et al. | 395/149 |
| 5,347,622 | 9/1994 | Takemoto et al. | 395/135 |
| 5,361,078 | 11/1994 | Caine | 345/1 |
| 5,374,940 | 12/1994 | Corio | 345/1 |
| 5,444,839 | 8/1995 | Silverbrook et al. | 395/141 |

*Primary Examiner*—Almis R. Jankus
*Attorney, Agent, or Firm*—Fitzpatrick, Cella, Harper & Scinto

[57] ABSTRACT

Information displaying apparatus for displaying animated video signals and combination animated and real-time video signals includes a controller for providing control signals for the information displaying apparatus and a host processor for generating graphics commands according to the provided control signals. A real time object graphics processor, controlled by the host processor, receives the generated graphics commands and generates graphics object image data in real-time according to the received graphics commands. A video coder, controlled by the host processor, receives the generated graphics object image data and outputs a video signal which comprises at least part of the received graphics object image data.

16 Claims, 2 Drawing Sheets

INFORMATION DISPLAYING SYSTEM WHICH DISPLAYS COMBINED VIDEO AND GRAPHICS IMAGES

BACKGROUND

1. Field of the Invention

The present invention relates to computer video graphics and, in particular, discloses an information display system configured for combining video source information with animated graphic objects in real-time for display.

2. Description of the Related Art

Video and similar display systems are known in the art and are often used for advertising and information presentation. One example is a moving LED sign which costs approximately AU$10,000. Video tape displays are often used but require periodic rewinding of the tape and, over tape wear and wear of the video tape player, can cause a loss of image quality. Video character generators overcome the wear problems of video tapes but are limited to displaying only characters and not natural or animated images. It is therefore desirable to provide a an arrangement by which video information can be presented for display at commercial prices and including the features of the various prior art devices.

SUMMARY OF THE INVENTION

In accordance with a first aspect of the present invention there is disclosed an information display system comprising:

communication means for receiving control signals from a controlling computer;

a host processor adapted to receive said control signals and generate graphics commands;

a real-time object (RTO) graphics processor configured for receiving said graphics commands and generating graphics object image data in real-time; and a video coder means connected to said host processor and said real-time object processor, said host processor being configured to control said RTO processor to output said image data and said video coder means to output a video signal comprising at least part of said image data.

Preferably, said information display system further comprises an input means for receiving a video source signal, and said video coder means is further connected to said input means, and said host processor is further configured to control said RTO processor and said video coder means, to augment said video source signal with said image data to produce the video output signal representing a selected combination of same.

In accordance with another aspect of the present invention there is disclosed an information display network comprising a plurality of said information display systems as set out above, interconnected together by said communication means to form a multiple information display system.

BRIEF DESCRIPTION OF THE DRAWINGS

A preferred embodiment of the present invention will now be described with reference to the drawings in which.

DETAILED DESCRIPTION OF THE PREFERRED EMBODIMENT

Figure 1:
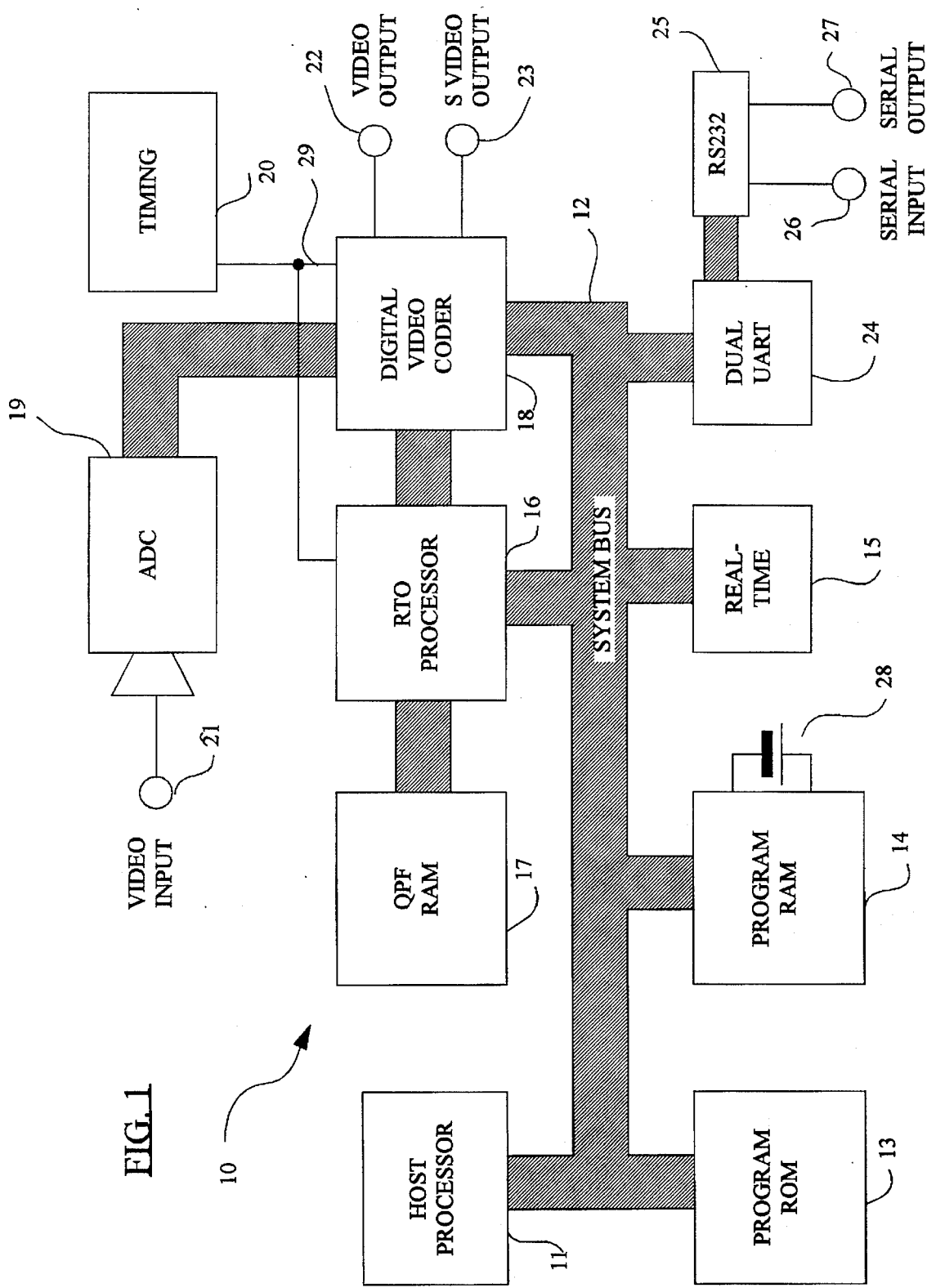
FIG. 1 is a schematic block diagram representation of the preferred embodiment.

As seen in FIG. 1, an information display system 10 is shown which is configured as a real-time animation system and operates in accordance with the technology disclosed in U.S. patent application Ser. No. 08/053,373, filed Apr. 28, 1993 claiming priority from Australian Patent Application No. PL 2147, Apr. 29, 1992, entitled "A Real-Time Object Based Graphics System" lodged by the same applicant, the disclosure of which is hereby incorporated by reference.

The information display system (IDS) 10 includes an embedded or host processor 11 which is connected to a system bus 12 and operates to control the operation of the IDS 10. In order to achieve real-time operation, the processor 11 is required to operate at approximately 5 MIPs and preferably has a 32-bit processor format. An example of a suitable device is the i960 SA manufactured by Intel Corp. The data bus 12 is a standard 16-bit bus and connects to a program ROM 13 and a program RAM 14. The ROM 13 contains the system code and a language interpreter for commands which are used by the host processor 11 to control the internal operation of the IDS 10 as well as real-time animation software including a range of outline fonts in an appropriate format for real-time object processing. Generally, the ROM 13 comprises approximately 512 KBytes. The RAM 14, which is generally about 256 KBytes, is used for storing animation command sequences generated by the host processor 11 while also acting as a scratch memory for the host processor 11 and for caching animation objects for higher levels of performance. The RAM 14 can be provided with a battery back-up 28 which affords non-volatile operation.

Connected to the bus 12 is an RTO processor 16 such as that specifically described in U.S. patent application Ser. No. 08/053,373 entitled "A Real-Time Object Based Graphics System". The RTO processor 16 connects to a dedicated QPF (quadratic polynomial fragment) RAM 17 comprising approximately 128 KBytes of 45 ns SRAM. The RTO processor 16 is a device specifically arranged to generate animation sequences at 13.5 million pixels per second suitable for printing and video applications. Preferably, the RTO processor 16 operates on objects described by object fragment (OF) data such as quadratic polynomial fragments (QPF's) which represent curve outlines of parts of graphic objects. The RTO processor 16 operates on those QPFs to output image data which is transferred to a digital video coder 18. Digital video coder 18 converts the digital information into a composite video signal as well as acting as a switch and combiner of real-time video data as well as real-time animation data supplied by, the RTO processor 16. Alternately, a RAMDAC and analog video encoder can be used.

The IDS 10 also includes a video input 21 which is configured to receive video data in standard raster format which connects to an analog-to-digital converter (ADC) 19 which supplies digital video data to the coder 18. The coder, which is preferably a Philips SAA 7199 device, is connected to the system bus 12 so that it can operate under the control of the host processor 11 to selectively combine an input video signal with graphic objects generated by the RTO processor 16. Alternatively, the coder 18 can be switched selectively by the RTO processor 16 so as to augment the input signal to provide a varied video output signal 22. The coder 18 is also configured to provide an S video output 23.

A timing unit 20 is included and provides a Gen-locked signal 29 to both the coder 18 and the RTO processor 16.

This ensures that each of those devices operate synchronously with each other, thus permitting total control of the video output signal 22 between various combinations of video and animation.

Two serial communications ports 26 and 27 are provided which connect to an RS 232 communications driver 25 which is in turn buffered to the system bus 12 via a UART 24. The serial communications are provided as a serial input port 26 and a serial output port 27 which provide for both upstream and downstream communications which permits multiple IDSs 10 to be interconnected under the control of a single computer device.

A real-time clock 15 also connects to the system bus 12 and is used so that the IDS 10 can be synchronised in absolute time, thus permitting animated events to be generated at pre-programmed points in time.

The IDS 10 is configured specifically as an information display and advertising system for use in shops, shopping centres, airports, private company offices and in other locations. It can be also be used for business presentations, training and animated user interfaces for embedded computer systems. In this manner, the IDS 10 can be programmed so as to manipulate video input data and to superimpose upon it, as well as augment it by various graphic objects such as text or pure animations so as to provide an enhanced display. In particular, by virtue of the bi-directional communications, multiple IDSs 10 can be used to drive an array of video monitors which form part of a video-wall or linear array.

In this manner, the images presented on each monitor can either be independent or show various portions of an entire scene or a large text.

Figure 2:
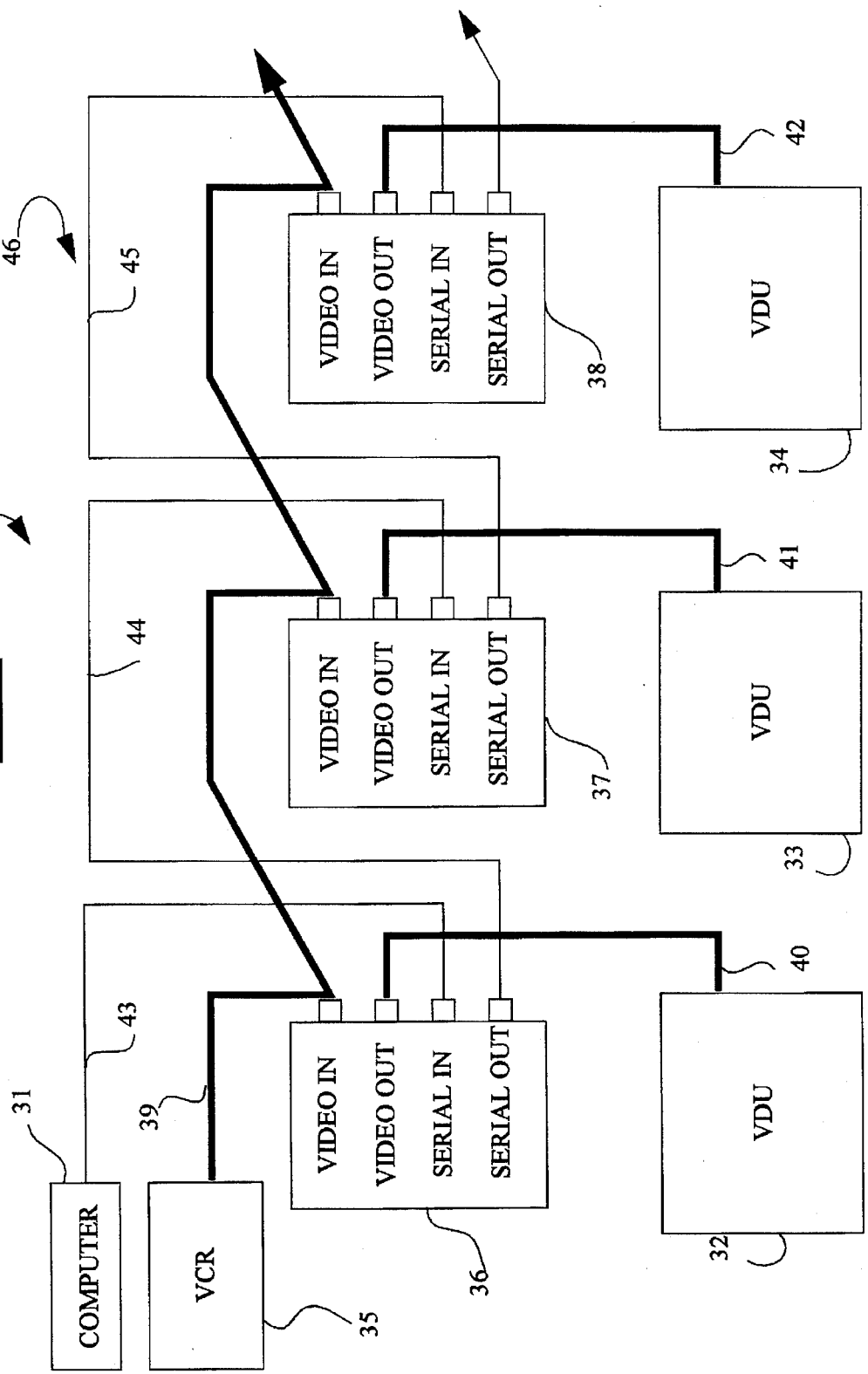
FIG. 2 shows one example of a network which uses three display systems of the preferred embodiments.

A specific example of the operation of the IDS 10 is shown in FIG. 2 where a video array 30 is shown which is controlled by a single computer 31. The array 30 outputs display images 40, 41 and 42 onto three video display units 32, 33 and 34. Supplying a video source to the array 30 is a video cassette recorder (VCR) 35 which outputs video data along a connection 39 to three IDSs 36, 37 and 38 each of which corresponds to the apparatus of FIG. 1. Each of the IDSs 36–38 connects to a respective VDU 32, 33 and 34.

However, it is seen from FIG. 2 that the IDSs 36, 37 and 38 are connected in a daisy chain 46 which connects the serial input and outputs thereof in a chain starting at the computer 31 supplying the input of IDS 36, the output of which connects to the input of IDS 44, and the output of which connects to the input of IDS 38. For example, the computer 31 can output control information to the first IDS 36 to divide video signals into thirds, whereby the IDS 36 is enabled to generate only the first one third of the animated image to the VDU 32. The IDS 36 outputs its own control information to the second IDS 37 which then displays the middle third of the animated image which in turn outputs to the one-third IDS 38 which outputs the remaining one third of the animation. In this manner, a single animation can be divided up and displayed on multiple VDUs, either as an enlarged, segmented display, or as a multiple display.

Only animation can appear enlarged over multiple screens because the present configuration does not include frame stores that are required to enlarge video images as in conventional, prior art, "video-walls".

It will be apparent to those skilled in the art that other configurations can be made. For example, the system can create animated objects only and as such, no video source is required. In this manner, a linear array of VDUs can be used to replace commonly used LED displays in advertising situations. Furthermore, such a configuration also provides for added versatility in the use of standard VDUs whereby the display can be readily switched from a sequential character or text display to a video format or a mixture thereof.

The foregoing describes only a number of embodiments of the present invention and modifications, obvious to those skilled in the art, can be made thereto without departing from the scope of the present invention.

We claim:

1. An information displaying apparatus for displaying combined source information with animated graphic objects, comprising:

communication means for receiving control signals for said information displaying apparatus from a controlling computer;

host processor means for interpreting the received control signals and for generating graphics commands according to the received controls signals, real-time object graphics processor means, controlled by said host processor means, for receiving the generated graphics commands and for generating graphics object image data in real-time and in a rasterised display order without the use of an image frame storage according to the received graphics commands; and video coder means, controlled by said host processor means, for receiving the generated graphics object image data and for outputting a video signal, at least a part of which comprises the received graphics object image data.

2. An information displaying apparatus according to claim 1, further comprising input means for inputting a video signal, wherein said video coder means receives the input video signal, combines the received video signal with the received graphics object image data to produce a combined video signal, and outputs the combined video signal.

3. An information displaying apparatus according to claim 1, further comprising communication means having an input port which receives the control signals from said control means and an output port which outputs control signals generated by said control means.

4. An information displaying apparatus according to claim 3, wherein said input port receives control signals from another information displaying apparatus and said output port outputs control signals, generated by said information displaying apparatus, to another information displaying apparatus.

5. An information displaying apparatus according to claim 1, further comprising timing means for providing an absolute time measurement to said video coder means and said real-time object graphics processor means for synchronizing said information displaying apparatus in absolute time.

6. An information displaying apparatus according to claim 1, operational with other of said information display apparatus in a linear array.

7. An information displaying apparatus according to claim 6, wherein said information displaying apparatus are controlled by a single computer.

8. An information displaying apparatus according to claim 1, operational with other of said information display apparatus in a video wall.

9. An information displaying apparatus according to claim 8, wherein said information displaying apparatus are controlled by a single computer.

10. An information displaying apparatus according to claim 1, further comprising host processor system code storage means for storing system code for said host processor.

11. An information displaying apparatus according to claim 1, further comprising memory means associated with said real-time object processor means for temporarily storing the graphics commands, the graphics commands comprising quadratic polynomial fragment information.

12. An information displaying apparatus according to claim 1, wherein the graphics commands comprise object fragment data representing outline curve fragments of graphics objects.

13. An information displaying apparatus according to claim 12, wherein the object fragment data comprises quadratic polynomial fragment information.

14. An information display network comprising a plurality of information displaying video apparatus, each said apparatus comprising:

communication means for receiving control signals for said information displaying apparatus from a controlling computer;

host processor means for interpreting the received control signals and for generating graphics commands according to the received control signals;

real-time object graphics processor means controlled by said host processor means, for receiving the generated graphics commands and for generating graphics object image data in real-time and in a rasterised display order without the use of an image frame storage according to the received graphics commands; and video coder means, controlled by said host processor means for receiving the generated graphics object image data and for outputting a video signal, at least a part of which comprises the received graphics object image data;

wherein said plurality of said apparatus are interconnected together by said communication means to form a multiple information display system.

15. An information display network according to claim 14, wherein said information displaying apparatus are interconnected in the form of a daisy chain.

16. An information display network according to claim 14, wherein each host processor means in each information displaying apparatus generates graphics commands for a different portion of an image.

* * * * *